United States Patent [19]

Kalliojarvi

[11] Patent Number: 6,121,927
[45] Date of Patent: Sep. 19, 2000

[54] DETERMINATION OF TERMINAL LOCATION IN A RADIO SYSTEM

[75] Inventor: Kari Kalliojarvi, Veikkola, Finland

[73] Assignee: Nokia Telecommunications Oy, Espoo, Finland

[21] Appl. No.: 09/301,376

[22] Filed: Apr. 27, 1999

Related U.S. Application Data

[63] Continuation of application No. PCT/FI97/00654, Oct. 27, 1997.

[30] Foreign Application Priority Data

Oct. 29, 1996 [FI] Finland .................................... 964353

[51] Int. Cl.⁷ ....................................................... G01S 3/02
[52] U.S. Cl. ............................................ 342/453; 342/457
[58] Field of Search .................................... 342/386, 450, 342/453, 457

[56] References Cited

U.S. PATENT DOCUMENTS

| | | | |
|---|---|---|---|
| 4,799,062 | 1/1989 | Sanderford et al. | ..................... 342/450 |
| 4,888,593 | 12/1989 | Friedman et al. . | |
| 5,513,215 | 4/1996 | Marchetto et al. | ..................... 375/233 |

FOREIGN PATENT DOCUMENTS

| | | |
|---|---|---|
| WO 88/01061 | 2/1988 | WIPO . |
| WO 95/14935 | 6/1995 | WIPO . |
| WO 95/14936 | 6/1995 | WIPO . |

OTHER PUBLICATIONS

"Super–resolution of multipath channels in a spreed spectrum location system" L. Dumont, et al., Electronic Letters, vol. 30, No. 19, Sep. 1994, pp. 1583–1584.

"Reciver diversity for spread spectrum" Thompson, et al. IEE Colloquium on Spreed Spectrum Techniques for Radio . . . 1994 p. 2/1–2/4.

"Wireless Position Location: Fundamentals Implementation Strategies and Sources of Error" Krizman, et al. IEEE 47th Vehicular Technology Conference. vol. 2, May 1997, p. 919–923.

"Direction Finding Methods for CDMA Systems" Biedka, et al. 13th Asilomar Conference on Signals, Systems and Computers . . . p. 637–641, Nov. 1996.

*Primary Examiner*—Thomas H. Tarcza
*Assistant Examiner*—Dao L. Phan
*Attorney, Agent, or Firm*—Altera Law Group LLC

[57] ABSTRACT

A radio signal travels over a radio channel in the form of multipath propagation, whereby a signal received by the base station and transmitted by the terminal equipment is composed of multipath components propagated over different distances and thus reaching the receiver at different times. Thus, the information required for computing the bearing of the received signal can be extracted from the arrival time differences of the multipath propagated signal. An antenna array formed by a plurality of antenna elements receives first the multipath propagated signal. Next, means (41, . . . , 4N) for determination of channel impulse response form an estimate of the radio channel impulse response from the received signal of each antenna array element, after which correlation means (46) correlate each channel impulse response estimate with a reference estimate selected from the group of said channel impulse response estimates. Further, said means choose as the time difference of the received signal that delay value giving the maximum correlation. Finally, computational means (46) estimate the bearing of the radio signal transmitted by the terminal equipment from the arrival time differences thus determined. Using a two-dimensional antenna array, both the bearing sector and elevation of the received signal can be estimated.

10 Claims, 4 Drawing Sheets

DETERMINATION OF TERMINAL LOCATION IN A RADIO SYSTEM

"This application is a continuation of international application number PCT/FI97/00654, filed Oct. 27, 1997, pending, which claims priority to Finish Application No. 964353, filed Oct. 29,1996."

SCOPE OF THE INVENTION

The present invention relates to a method of locating the position of terminal equipment in a system in which one part of a subscriber connection is formed by a radio connection between the terminal equipment and a base station. Such a system can be, e.g., a cellular mobile radio system of several base stations in which the terminal equipment during a connection may move from one cell to another.

BACKGROUND OF THE INVENTION

Conventionally, information on the accurate position of terminal equipment during the connection between the terminal equipment and a base station has not generally been considered crucially important. However, in planning of radio systems such as cellular telephone systems, the distance of the terminal equipment from the base station must be taken into account, with particular attention being paid on the variation of the distance during connection. This is vital especially in time division digital cellular systems in which transmission is carried out in bursts during a given transmit time slot. In order to prevent bursts transmitted at the same carrier frequency in consecutive time slots from overlapping in the received signal at the base station, the bursts transmitted by each individual mobile terminal are extended by a guard time of a certain duration at the end of each burst. Such a guard time is necessary, because the mobile terminals transmitting at the same radio carrier, but in consecutive time slots, are located at random distances from the base station, whereby also the propagation time of radio waves from the base station to the mobile terminal will vary from time slot to time slot. The guard time is determined so that the base station, within the timing margin of the transmit/receive frame, measures the arrival time difference between the burst transmitted by the base station and the burst received from the mobile terminal and subsequently computes a timing advance (TA), after which the base station transmits the value thereof to the mobile terminal. Thus, the base station dynamically controls the transmit time of each mobile terminal on the basis of bursts received therefrom. In a GSM system, the timing advance may be assigned values in the range 0–233 ms, which in relation to the time slot overall duration means that a mobile terminal operating with the maximum timing advance cannot be farther away than 35 km from the base station.

As it is generally known, the location of an emitting signal source always requires more than one receiver, spatially separated from each other. Methods of signal direction estimation are based on the estimation of time differentials needed by the same signal to reach the different receivers. Estimation of received signal arrival time differences is performed by correlating the output signals from different receivers. The intersignal delay which gives the maximum value of the correlation function represents the estimate of maximum likelihood for the arrive time difference, provided that said value of the correlation function exceeds a preset threshold value.

In a cellular radio system, the above-described procedure is carried out so that the transmit signal of a mobile terminal is received at a plurality of base stations, or alternatively, at a base station equipped with an array of antenna elements with individual receivers. Then, the received signals obtained from the different base stations or an antenna array of a single base station can be correlated with each other in order to determine the arrival time differences, and therefrom, the bearing angle of the received signal.

These conventional approaches are hampered by the computational complexity involved in relation to the accuracy offered by them.

However, in some cases it is a desirable property of the network to provide maximally exact information on the location of the mobile terminal. One such case is encountered when it is required to restrict the movement of the mobile terminal to occur within the coverage area of a given cell only or when a more detailed scheme of call charging rates is desired.

One approach to the location of a mobile terminal is presented in FI Pat. Appl. No. 963,382, filed in Aug. 30, 1996, not yet public at the filing date of the present application. This method uses an estimated value of the timing advance, which is a readily available value computed by the communications system, proportional to the distance between the terminal equipment and the base station. While the estimate of the timing advance computed for the distance between the serving base station and the terminal equipment gives only a rough estimate of the terminal equipment's distance from the base station, but the estimate of the terminal equipment timing advance computed for a greater number of base stations already gives the terminal equipment location with a relatively good accuracy. The latter technique is supported by the OTD (Observed Time Difference) property of Phase 2 of the GSM standard that directly gives the propagation time differences of the signals from the mobile terminal to the different base stations. Cited patent application further suggests that, in CDMA (Code Division Multiple Access) systems, the mobile terminal location can be determined by correlating the pilot signals transmitted by the base stations.

The location of terminal equipment is especially important also in authority networks. These networks are private cellular networks which are particularly designed to operate under different distress situations, too. Herein, it is important that the network can identify the location of the terminal equipment without the need for the mobile terminal operator to verbally report his location. In open networks, the mobile terminal location information would also be a desirable property in emergency call situations, because the emergency call originator does not necessarily always know his exact location.

It is an objective of the present invention to provide a mobile terminal location method which is characterized by simple computation routines and maximum utilization degree of the properties of existing communication networks.

The goals of the invention are achieved by virtue of the specifications expressed in the appended independent claims.

SUMMARY OF THE INVENTION

The invention is based on the idea that, since a radio signal travels over a radio channel in the form of multipath propagation, whereby the terminal equipment transmit signal received by the base station is composed of time-dispersed multipath signal components propagated over different distances and thus reaching the receiver at different times, all the information required for computing the bearing of the received signal can be extracted from the differences of the dispersed arrival times of the multipath signal. Accordingly, the multipath propagated signal is first received by means of an antenna array of the base station, whereafter the channel estimates of the signals received by the individual antenna array elements are formed and then correlated to determine the relative time differences between them. Finally, the estimated bearing of the received signal can be computed from these differences of the arrival time estimates of the individual antenna signals.

The method according to the invention is suited for use in conjunction with a conventional one-dimensional antenna array, so called a linear array, whereby only the bearing angle of the received signal can be estimated. According to a preferred embodiment of the invention, a two-dimensional or three-dimensional antenna array is used. Then, the bearing angle information can be complemented with the estimation of the signal elevation angle. Hence, using geometrical rules, the location of the terminal equipment can be computed from the known values of the antenna array height from the ground and the estimated bearing and elevation angles of the signal received by the antenna array.

The accuracy of position determination may further be improved if the concept can be extended to a greater number of base stations, each equipped with a same type of antenna array. Then, the estimate of received signal bearing at each base station is determined according to the invention, and the actual location of the mobile terminal is subsequently computed from these bearing angle estimates.

A significant benefit of the disclosed method over conventional techniques is its computational simplicity. As only the channel estimates are correlated, the number of required computational operations is reduced radically. The resolution achieved herein is at least as good as with conventional methods, because the arrival time differences between the individual antenna signals can be determined with the resolution of one sample interval, and the lesser complexity of arrival time difference determination can be utilized in the postprocessing of the information. Particularly with the use of two or three-dimensional antenna arrays, postprocessing can render a significant improvement in the achievable accuracy, because the bearing of the received signal changes relatively slowly.

BRIEF DESCRIPTION OF DRAWINGS

In the following, the invention will be examined in greater detail with reference to the accompanying drawings, in which.

DETAILED DESCRIPTION OF THE INVENTION

Figure 1:
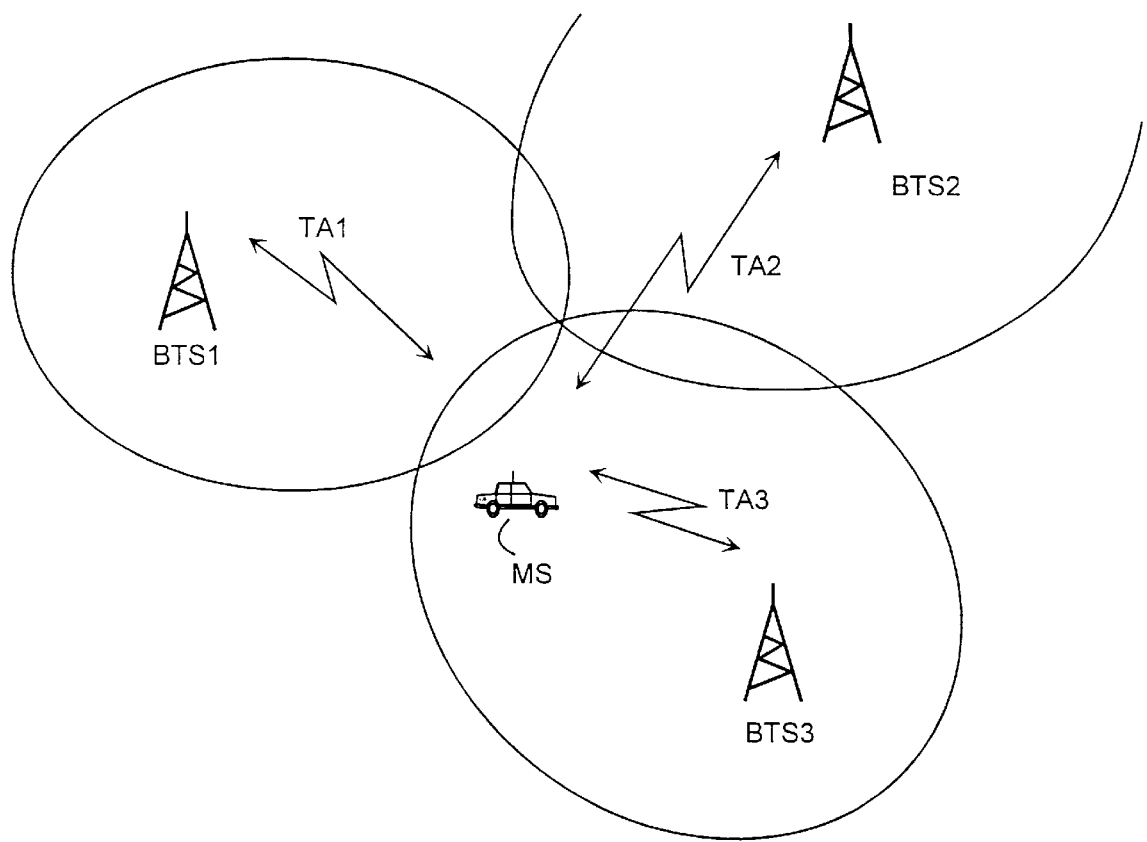
FIG. 1 depicts a cellular network.

Referring to FIG. 1, therein is illustrated a typical cellular system, in which the terminal equipment, here a mobile station MS, is connected via a radio channel to a base station BTS1, from where the connection is continued further over wire. The terminal equipment may move during the connection from one cell to another, requiring the radio channel to be correspondingly handed over from one base station to another, e.g., in a sequence BTS1→BTS2→BTS3.

A method conventionally used in a TDMA system for locating terminal equipment is based on the use of estimated timing advance values TA1, TA2 and TA3. As the value of each timing advance is proportional to the terminal equipment distance from the base station, it is easy to estimate the terminal equipment location relatively accurately on the basis of these timing advance estimates. This approach has a particular advantage in that the communication system anyhow computes the timing advance values.

The present invention draws upon the idea of using a conventional antenna array. Such an antenna array is comprised of a plurality of antenna elements acting as individual antennas. By phasing the antenna elements in this type of antenna array, it is possible to steer the maximum of the radiation power in a desired direction or spatial angle, while in other directions the radiation power is strongly suppressed, i.e the antenna array is used in forming a desired radiation pattern.

The simplest configuration of an antenna array is the one-dimensional linear array having the elements equidistantly spaced in a linear fashion; the next more complex configuration is a two-dimensional array having the elements located in the same plane, e.g., at the corners of a rectangle; and the most complex configuration is a three-dimensional array having the elements forming a spatial structure such as a cube or pyramid. Arrangements are provided for individual handling of the element receive/transmit signals, respectively, in each antenna configuration.

Figure 2:
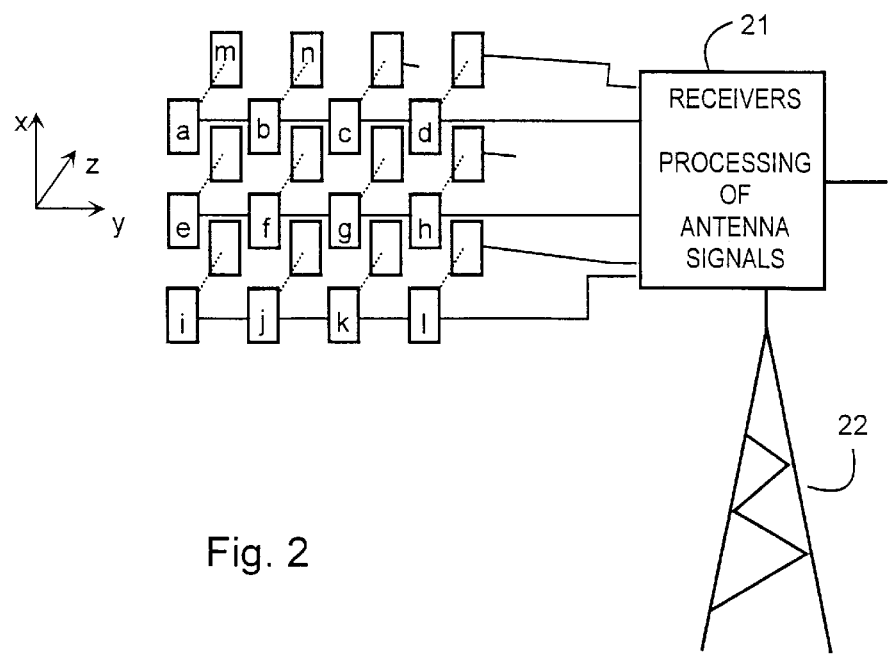
FIG. 2 shows an antenna array at a base station.

Now referring to FIG. 2, an exemplifying embodiment of antenna array mounted at the top of an antenna mast 22 has a three-dimensional configuration comprising a first set of antenna elements a, b, c, d, e, f, ..., k, l in an xy plane at the intersection points of an equidistantly spaced grid, and a corresponding second set of antenna elements m, n, ..., etc., also in an xy plane, spaced vertically at a distance z from the first plane. The signals received and transmitted by the elements are processed in an antenna signal processing block 21.

In the description below, it is assumed that the cellular system concerned is a CDMA system, whereby the base stations of FIG. 2 perform the transmission by spreading the information over the entire transmission bandwidth by means of a spreading code individually allocated for each connection. Thus, the terminal equipment such as a mobile station MS (FIG. 1), for instance, has established a connection with a base station BTS1 by spreading its transmission power over the entire radio channel bandwidth using its individual spreading code. Additionally, it is assumed that the base station is equipped with a two- or three-dimensional antenna array, e.g., of the type shown in FIG. 2.

The CDMA signal transmitted by the terminal equipment, whose location is to be determined, reaches each element of the antenna array in the base station as a plane wave. The signal received by each antenna array element has undergone multipath propagation, thus being composed of a number of time dispersed signal components reaching each element at different times. From each antenna element, the signals are further taken to a conventional Rake receiver. A separate receiver is provided for each antenna element.

Figure 4:
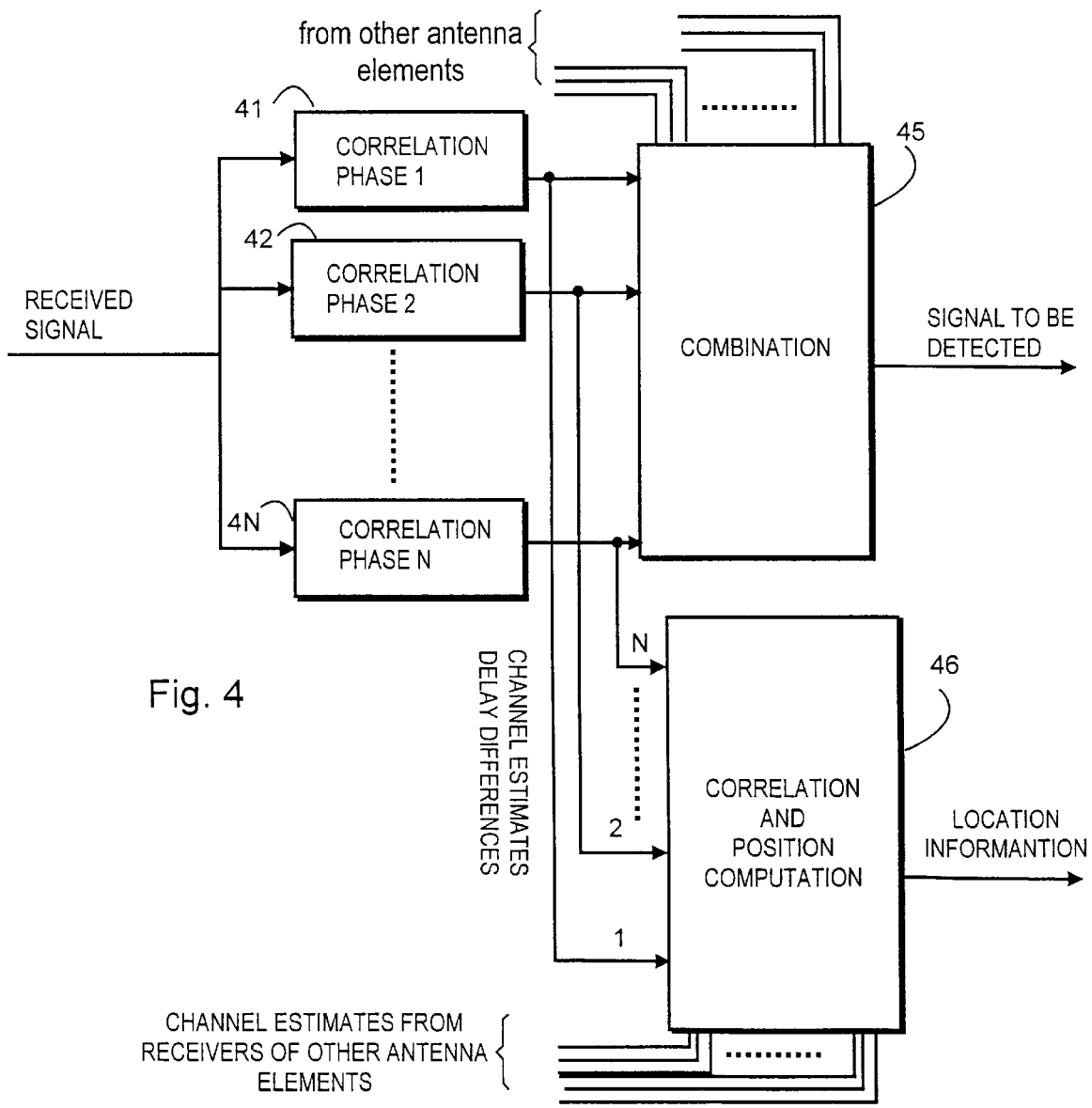
FIG. 4 shows the block diagram of a receiver.

In FIG. 4 is shown a receiver comprising a bank of N correlator blocks, denoted in the diagram as blocks 41, 42, ..., 4N. In each block, the received signal taken to the block from an antenna element is correlated with the same code used for spreading the signal in the sending terminal equipment, but by varying the time delay, whereby the multipath propagation components can be obtained from the received signal. According to the number N of the correlator blocks, N pcs. of multipath propagation components can be resolved that in combination form the impulse response of the radio channel between a given antenna array element and the terminal equipment.

Figure 3:
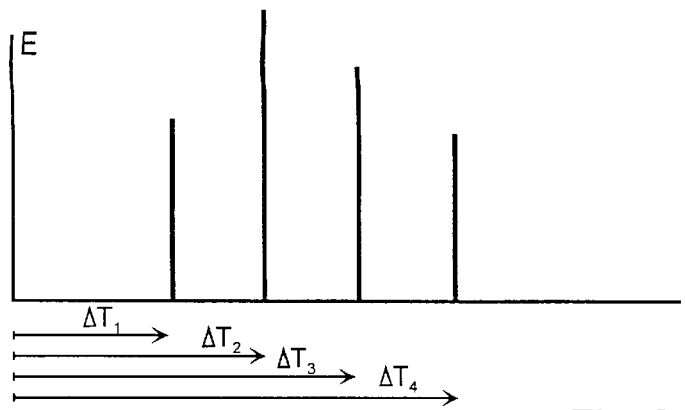
FIG. 3 shows a graph of a delay distribution of the received signal.

The channel impulse response may have a shape similar to the one shown in FIG. 3 in the case that 4 pcs. correlator blocks (N=4) are used. Here, tap 1 is produced by correlator block 1, tap 1 by correlator block 2, etc. The heights of the taps correspond to the spectral power of each signal component propagated over different paths, and the distances of the taps are proportional to the arrival time difference of the impulse signal component relative to a zero time point representing a reference time. Accordingly, the arrival delay to tap 1 is DT1, the arrival delay to tap 2 is DT2, the arrival delay to tap 3 is DT3, and the arrival delay to tap 4 is DT4. Corresponding multipath channel response estimates are obtained from each receiver connected to an antenna array element and all the signal estimates are taken to a combinatory block, where they are summed coherently. The summing result is then passed to a detector.

For the most of its parts, the above-described technique is well known in the art. Now, according to the invention, the conventional summing step is complemented by correlating the multipath channel response estimates produced by each of the receivers. The multipath channel response estimates and their propagation delay values obtained from the correlator bank are taken to a correlator/position computing block 46. As the estimation of the received signal bearing is based on the estimation of the arrival time differences between the instants when the same signal reaches the different receivers, the estimation of these time differences can be performed in the block 56 by correlating the output signals of the different receivers. Hence, the input signals of the block 56 also include the channel response estimates from the outputs of the other receivers of the antenna array elements. The delay value between the channel response estimates producing the highest correlation gives an estimate for the arrival time difference, provided that said correlation function value is larger than a preset threshold.

Figure 7:
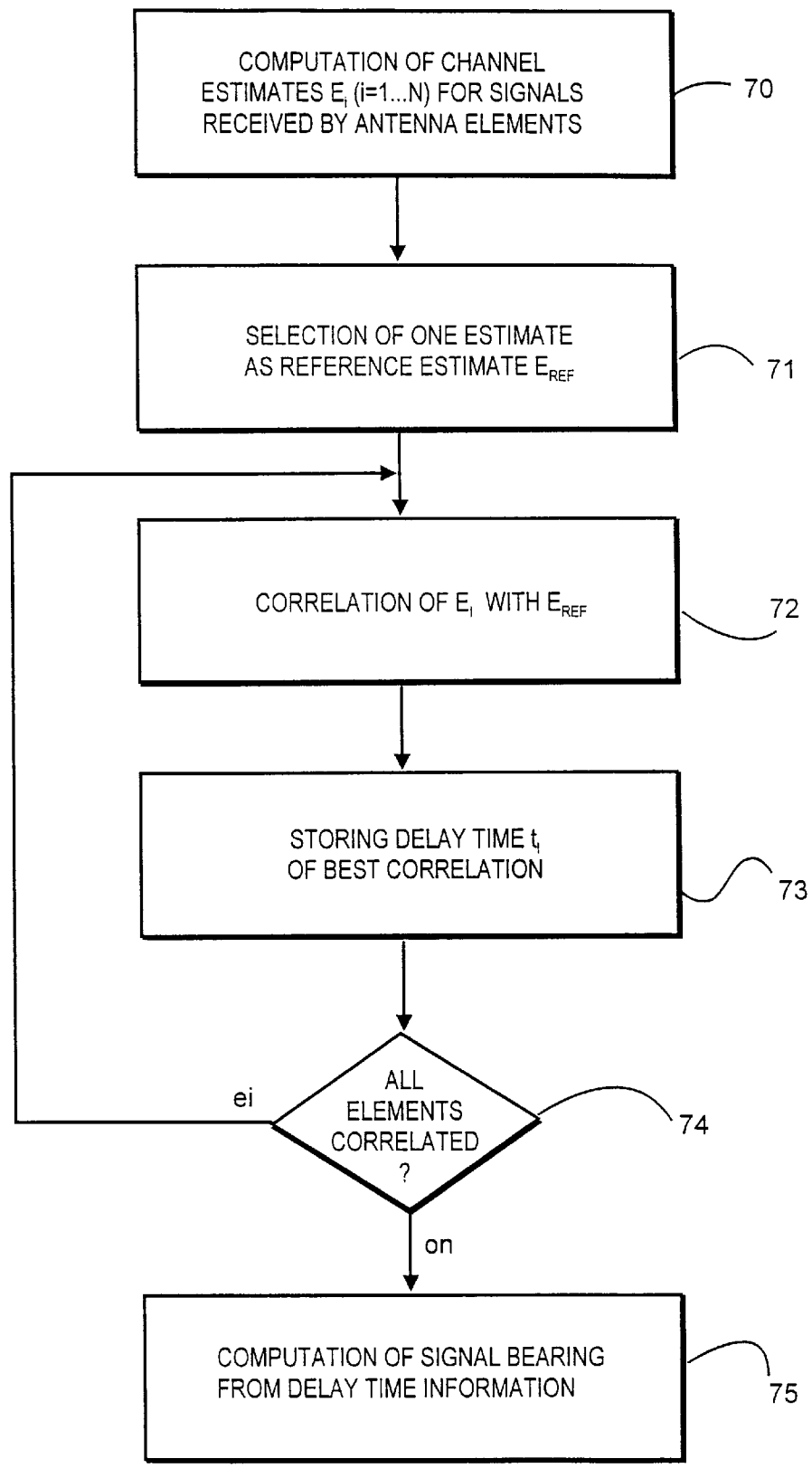
FIG. 7 shows a flow chart of the method.

Next, the function of the invention is explained by making reference to FIG. 7. Correlation is advantageously carried out so that a multipath channel response estimate $E_{REF}$ obtained from any one of the antenna array elements is selected as the reference, stage 71. For instance, in the diagram of FIG. 2, the multipath channel response processed from the antenna signal of array element I has been selected as the reference. Next in the procedure, a search routine is carried out to test how much the multipath channel response estimate obtained from the antenna signal of the adjacent array element k must be shifted temporally to achieve the best coincidence (matching) with the multipath channel response estimate $E_{REF}$ obtained from the antenna signal of array element I, stage 72. After this correlation is maximized, the corresponding value of the temporal shift $t_j$, which is equivalent to the arrival delay difference, is stored, stage 73, and the equivalent correlation operation is performed for the next antenna array element j in sequence. Thus, the correlation routine is sequentially repeated for each multipath channel response estimate produced by the correlator block, after which the best match of the multipath channel response estimate for the received signal of each antenna array element is obtained. It must be noted herein that the receivers connected to the antenna array elements must operate in a synchronous mode in order to obtain a correct result.

After each of the antenna array element received signals are processed, it is known how much the channel response estimate of each antenna array element must be temporally shifted with respect to the tap diagram (refer to the tap diagram of FIG. 3) of the reference element, whereby the delay difference of the received signal in each antenna array element with respect to the reference element received signal is resolved. Subsequently, the bearing of the antenna signal can be computed, stage 75.

Figure 5:
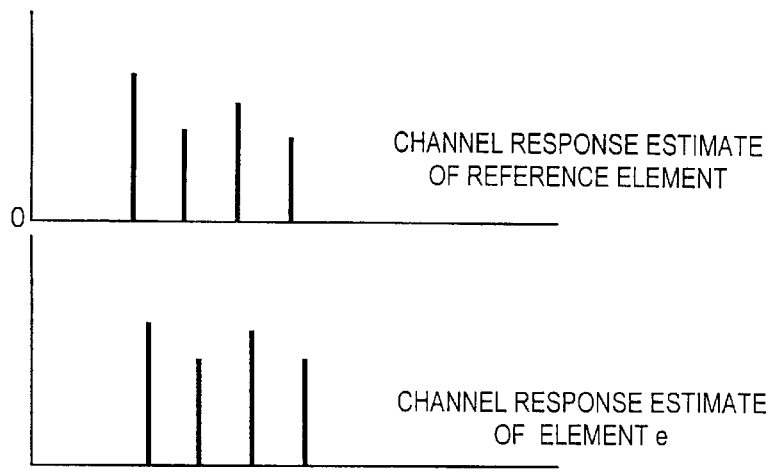
FIG. 5 shows some channel response estimates.

The correlation procedure is further elucidated in FIG. 5, whose upper part shows the four-tap diagram of the channel response estimate for the received signal of reference element I, while the lower part shows the corresponding four-tap channel response estimate for antenna array element e. The channel response estimates are plotted on the same time scale, and the common time reference point is formed by the reference time point of channel response signal taps of the reference element itself. The function of correlation is to find such a value of time shift which, when applied to the channel response estimate of element e, maximizes the value of each desired correlation function.

Figure 6:
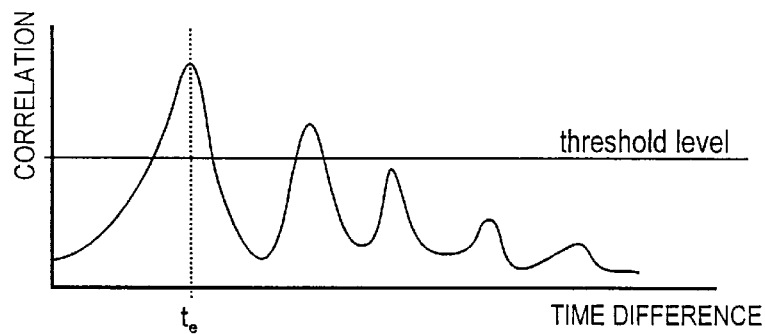
FIG. 6 depicts correlation of channel response estimates.

In FIG. 6 is illustrated a possible shape of the correlation function when the channel response estimate of antenna array element e is shifted along the time axis. It can be seen from the graph that the best correlation is obtained when the channel response estimate of element e is shifted by a time $t_e$. Obviously, this time is also equivalent to the arrival time difference between the received signals at the antenna array elements.

Figure 8:
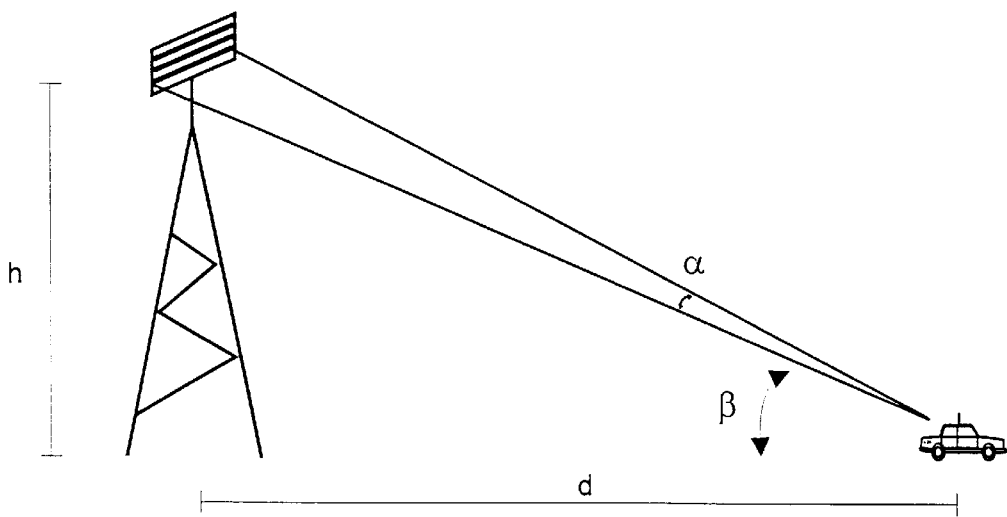
FIG. 8 illustrates determination of mobile terminal distance.

After the arrival time differences between each individual antenna element received signal is computed, the bearing of the received signal can be estimated using the geometry notation of FIG. 8. If the antenna array used is a one-dimensional linear array, only the sector of the received signal, that is, its bearing angle a can be determined, while the distance of the terminal equipment cannot be computed. In most cases, information on the bearing sector of the terminal equipment will suffice. On the other hand, if the antenna array is two- or three-dimensional, also the signal elevation angle b of the received signal can be computed. Thus, on the basis of the known spatial angle coordinates (bearing and elevation) of the signal source, normal rules of geometry can be applied for computing the distance d of the terminal equipment from the base station. Accordingly, the procedure is capable of locating the terminal equipment.

As described above, the present method is based on extracting all the information required for the determination of the received signal bearing from the arrival time differences of the multipath signals, whereby other information carried by the received signal, such as the subscriber transmit signal spreading code or the transmitted symbol data, does not essentially affect the estimation of the received signal bearing.

The most advantageous application of the invention is found in a CDMA system, because the multipath channel response estimates are continuously and directly available from the CDMA receiver, thus obviating a separate computation thereof. Another possible application can be found in a TDMA system in which the channel impulse response of the received signal is computed for the purpose of adjusting the channel equalizer. The multi-element antenna array provides a number of channel responses which are correlated with respect to a common time reference point, after which the multipath propagation time differences can be computed. Finally, the bearing of the received signal can be computed from the arrival time differences.

In both applications, the computational accuracy can be improved by subjecting the results to processing such as low-pass filtration, for instance, since the received signal bearing under realistic conditions varies at a relatively slow rate. Thus, the filtration process permits elimination of random transients from the estimates of the mobile station distance.

Analogously with all other techniques known in the art, the accuracy of the present method is largely dependent on the quality of the radio channel. If a direct line-of-sight can be established between the base station and the terminal equipment, the location of the mobile station is easy to determine, but under conditions of large channel response dispersion, whereby the received signal is comprised of multireflected signal components, the location of the terminal equipment may become an impossible task. Such a situation may occur in large macrocells of a network.

The above description of the method according to the invention concerns an application to a single base station only. When desired, the accuracy of terminal equipment location can be improved by exploiting a technique called macrodiversity, which means an extension of the computational grid to cover the neighbouring base stations, too. Thus, the mobile terminal location can be performed using the bearing estimates computed by each of the base stations. This arrangement presumes that the bearing information is gathered to a single point, where the final computation of the terminal equipment location is performed. In this arrangement, the receivers of the different base stations need not necessarily be run in mutual synchronism, but the base stations should have identical antenna arrays and the receivers connected to the antenna array must be run in mutual synchronism at each base station.

What is claimed is:

1. A method of locating the position of terminal equipment in a system in which one part of the subscriber connection is formed by a radio connection between the terminal equipment and a base station and in which a signal transmitted by the terminal equipment is received in the form of a multipath propagated signal by the base station antenna, said antenna comprising an antenna array formed by a plurality of antenna elements, characterized in that an estimate of a radio channel impulse response is formed from the received signal of each antenna array element, each channel impulse response estimate is correlated with a reference estimate selected from a group of said channel impulse response estimates which composes respective correlation function and the propagation time difference of each channel impulse response estimate with respect to reference estimate is obtained as the maximum of the correlation function, and the spatial angle of the radio signal transmitted by the terminal equipment is estimated from the time differences thus determined.

2. A method as defined in claim 1, characterized in that the antenna array used is an at least two-dimensional array, whereby the direction of the radio signal can be resolved for both a bearing angle and elevation angle of the received signal.

3. A method as defined in claim 1, characterized in that the antenna array used is a one-dimensional array, whereby the direction of the radio signal can be resolved only for a bearing angle of the received signal.

4. A method as defined in claim 1, characterized in that said system is a CDMA system and that the channel impulse response estimates directly available from the CDMA receiver are utilized.

5. A method as defined in claim 1, characterized in that the radio signal transmitted by said terminal equipment is received at a plurality of base stations, and the location of said terminal equipment is resolved on the basis of spatial angle information estimated at each base station.

6. A method as defined in claim 1, characterized in that the resolved bearing information is subjected to low-pass filtration.

7. A system in which a part of the subscriber connection is formed by a radio connection between the terminal equipment and a base station and in which system a signal transmitted by the terminal equipment is received in the form of a multipath propagated signal by the base station antenna, which comprises an antenna array formed by a plurality of antenna elements, characterized in that said system further includes means (41, . . . , 4N) for determination of channel impulse response, said means forming an estimate of a radio channel impulse response from the received signal of each antenna array element, correlations means (46), said means correlating each channel impulse response estimate with a reference estimate selected from a group of said channel impulse response estimates which composes respective correlation function and, for each antenna array element, said correlation means choosing as the time difference of the received signal that a time shift giving the maximum of the correlation function, and computation means (46) for estimating the spatial angle of the radio signal transmitted by the terminal equipment from the arrival time differences thus determined.

8. A system as defined in claim 7, characterized in that said antenna array is an at least two-dimensional array, whereby the direction of the radio signal can be resolved for both a bearing angle and elevation of the received signal.

9. A system as defined in claim 7, characterized in that the antenna array used is a one-dimensional array, whereby the direction of the radio signal can be resolved only for a bearing angle of the received signal.

10. A method as defined in claim 7, characterized in that said system is a CDMA system and that said means (41, . . . , 4N) for determining the channel impulse response are an inherent part of a conventional CDMA receiver.

* * * * *